UNITED STATES PATENT OFFICE.

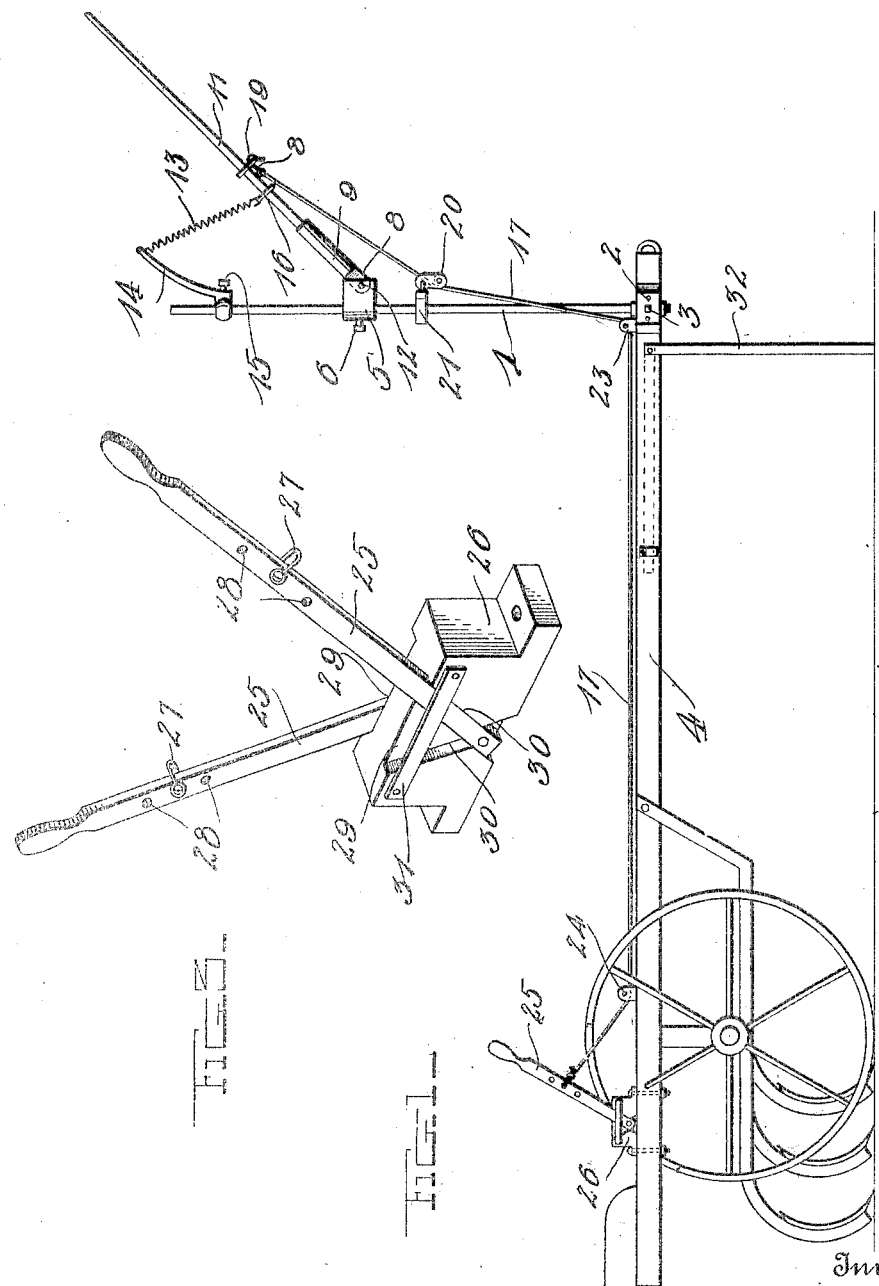

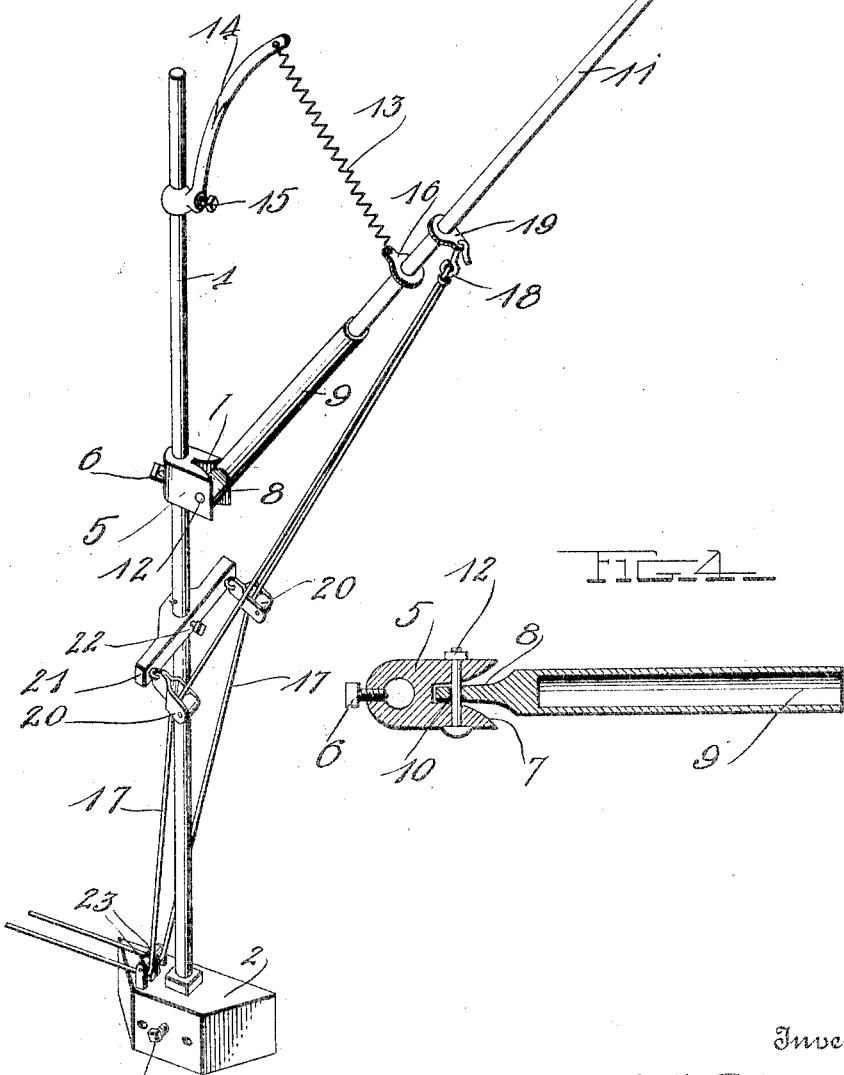

CARL C. ADAMSON, OF KENMARE, NORTH DAKOTA

WHIP-OPERATING DEVICE.

1,009,949.  Specification of Letters Patent.  Patented Nov. 28, 1911.

Application filed March 6, 1911. Serial No. 612,569.

*To all whom it may concern:*

Be it known that I, CARL C. ADAMSON, a citizen of the United States, residing at Kenmare, in the county of Ward and State of North Dakota, have invented certain new and useful Improvements in Whip-Operating Devices; and I do declare the following to be a full, clear, and exact description of the invention, such as will enable others skilled in the art to which it appertains to make and use the same.

This invention relates to improvements in whip operating devices.

One object of the invention is to provide a device of this character adapted to be attached to an agricultural machine, vehicle or the like whereby the whip may be applied to draft animals that cannot be reached in the ordinary manner.

Another object is to provide a whip operating device which will be simple, strong, durable and inexpensive in construction, efficient in operation and having means whereby the same may be readily actuated by the driver for applying the whip to either horse.

With these and other objects in view, the invention consists of certain novel features of construction, combination and arrangement of parts as will be more fully described and particularly pointed out in the appended claims.

In the accompanying drawings: Figure 1 is a side view of a portion of a cultivator showing the application of the invention; Fig. 2 is a perspective view of the whip supporting and operating mechanism; Fig. 3 is a detail perspective view of the levers for actuating said whip operating mechanism; Fig. 4 is a longitudinal sectional view through the whip socket and the coupling member by means of which the same is adjustably secured to the supporting standard of the device.

In the embodiment of the invention I provide a vertically disposed supporting standard 1 the lower end of which is engaged with and adjustably secured in a supporting block 2 by means of a set screw 3. The block 2 is adapted to be secured to the outer end of the tongue 4 of an agricultural machine, vehicle or the like whereby said standard is held in position to support the whip and its operating mechanism. Slidably mounted on the standard 1 is a socket supporting block 5 provided with a set-screw 6 by means of which the same is adjustably secured to the standard 1. In the outer edge of the block 5 is formed a flared or substantially V-shaped notch 7 with which is engaged the flattened inner end 8 of the whip socket 9 adapted to receive and support an ordinary or any suitable form of horse whip 11. The flattened inner end of the socket is provided with a pivot hole 10 the outer ends of which are flared outwardly and through which and the adjacent sides of the block 5 is inserted a pivot bolt 12 by means of which said socket is pivotally connected to the block.

The whip 11 is yieldingly supported at the proper inclination for being brought into engagement with the draft animals by means of a coiled spring 13 the upper end of which is secured to a supporting arm or bracket 14 which is slidably engaged with the standard 1 and is held in its adjusted positions thereon by a set screw 15. The lower end of the spring is connected with a ring or apertured plate 16 which is engaged with the whip adjacent to the outer end of the socket 9 as shown.

The whip operating mechanism comprises a pair of operating cords 17 the outer ends of which are secured to a hook 18 adapted to be hooked into a ring or apertured plate 19 engaged with the whip 11 adjacent to and preferably a short distance in advance of the tongue 16. The cords 17 are held apart and caused to swing the whip in opposite directions when pulled by means of guide pulleys 20 connected to the ends of a cross head 21 which is slidably engaged with the standard 1 and fastened in its adjusted positions by a set screw 22 as shown. The cords 17 after passing through the guide pulleys 20 extend downwardly and pass around guide pulleys 23 secured to the supporting block 2 and from thence extend back along the tongue of the vehicle and under guide pulleys 24 secured to the rear portion thereof and are connected at their inner ends to operating levers 25. The operating levers 25 are pivotally connected at their lower ends to the opposite sides of an attaching block 26 which is adapted to be bolted to the inner end of the tongue or to any other suitable part of a machine or vehicle whereby said levers will be within convenient reach of the driver. The inner ends of the cords 17 are connected to links 27 which are adjustably secured to the levers 25 by means of bolts which are adapted to be engaged with one of a series of bolt holes 28 formed in the levers as shown. The pivoted inner ends of the levers 25 are engaged with V-shaped notches 29 formed in the opposite sides of the block 26, the inclined walls 30 of said notches forming angular stops which limit the movement of the levers in either direction. The levers are held in operative engagement with the notches 29 by means of strips or cleats 31 secured to the opposite sides of the block 26 as shown. In thus arranging the operating mechanism it will be readily seen that when one or the other of the levers 25 is pulled rearwardly the cords 17 will be actuated and the whip thus pulled downwardly and laterally one side or the other and into engagement with either of the lead horses. When the lever is released the spring 13 will quickly restore the whip to its normal position. By pulling back more or less forcibly on the levers the whip may be brought into greater or less forcible engagement with the animal it is desired to strike.

When the whipping mechanism herein described is applied to the tongue of a vehicle or machine the tongue is also preferably provided with a supporting rod 32 which when the animals are unhitched is adapted to be swung down to support the outer end of the tongue and thus hold the whipping mechanism out of the way and prevent the same from interfering with the hitching or unhitching of the animals. In connection with the whipping mechanism, I preferably employ a spreader stick secured at its opposite ends to the bridles of the rear draft animals whereby the heads of the latter are prevented from interfering with the operation of the mechanism. This spreader stick may be of the usual or any desired construction and forms no part of the present invention and an illustration of the same is therefore not thought to be necessary.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. A whip operating device comprising an upright supporting standard, means to secure said standard to a suitable part of a vehicle, a whip socket pivotally and adjustably secured to said standard and adjustable longitudinally thereon and adapted to be swung laterally, means adapted to engage and yieldably hold a whip at the proper angle, and operating cords having means for engagement with a whip whereby the whip may be swung downwardly and laterally by the driver.

2. A whip operating device comprising a standard, means to detachably secure the standard to a suitable part of a vehicle, a whip supporting block slidably and adjustably secured to said standard, said block having in its outer edge a flared notch, a whip socket having a flattened inner end adapted to be engaged with and pivotally connected with the notch in said block, a bracket adjustably connected to the upper end of said standard, a spring having one end connected to said bracket, means to connect the opposite end of the spring with a whip whereby the whip is yieldingly supported, operating cords having their outer ends adapted to be connected with a whip and extending back to within convenient reach of the driver of the vehicle, guide pulleys adapted to receive said cords whereby when the same are pulled by the driver the whip will be swung in one direction or the other and thus applied to one or the other of the leading draft animals.

3. A whip operating device comprising a supporting standard, an attaching block adapted to be secured to the tongue of the vehicle or agricultural machine and adapted to receive the lower end of said standard, means to secure said standard in the block, a whip socket adjustably and loosely connected to said standard, a spring connected to yieldingly hold a whip at the proper inclination, a cross-head adjustably secured to said standard, guide pulleys loosely connected to the opposite end of said cross lead, guide pulleys secured to said attaching block and to the tongue of the vehicle, a pair of pivotally mounted operating levers and operating cords connected with said levers and extending through said pulleys, means to connect the outer ends of said cords with a whip whereby when the levers are operated the whip may be swung down in either direction and thus applied to either of the leading draft animals.

In testimony whereof I have hereunto set my hand in presence of two subscribing witnesses.

CARL C. ADAMSON.

Witnesses:
L. F. CLAUSEN,
V. E. GRUNNETT.